July 31, 1962  R. REGIS  3,047,818
OSCILLATOR FREQUENCY COMPENSATOR
Filed April 9, 1959
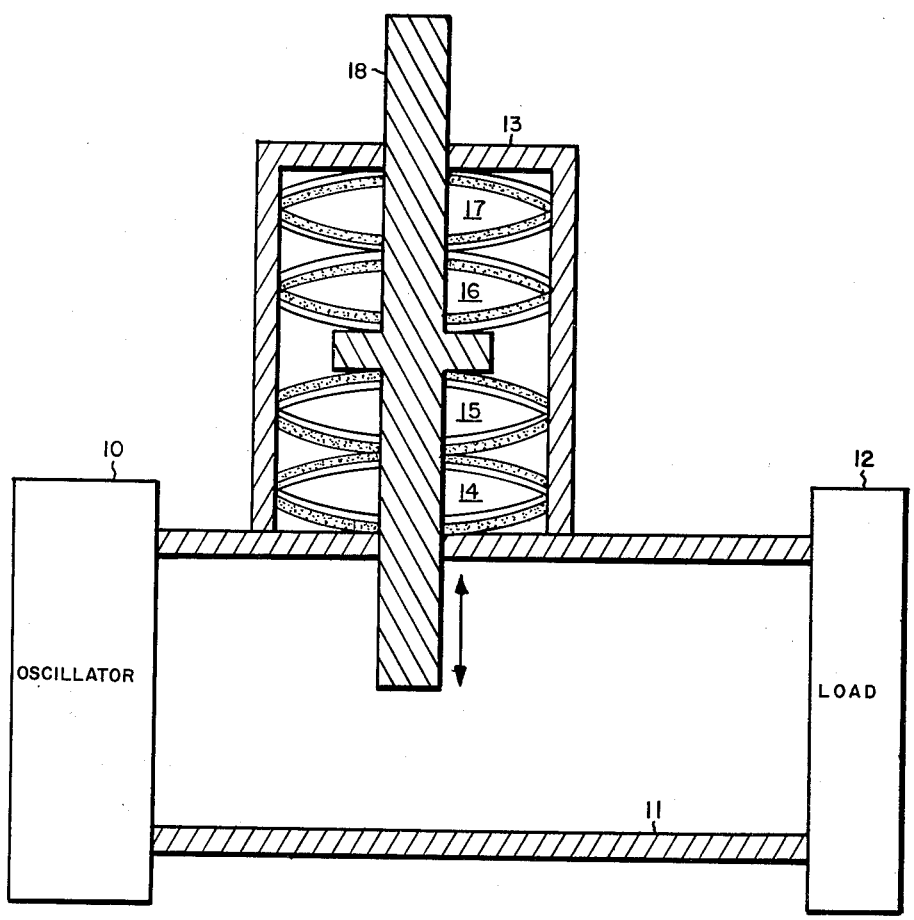

United States Patent Office 3,047,818
Patented July 31, 1962

3,047,818
OSCILLATOR FREQUENCY COMPENSATOR
Robert Regis, Fresh Meadows, N.Y., assignor to Hazeltine Research, Inc., Chicago, Ill., a corporation of Illinois
Filed Apr. 9, 1959, Ser. No. 805,240
4 Claims. (Cl. 331—66)

*General*

This invention relates to an oscillator frequency compensator which is capable of maintaining the oscillator frequency constant or nearly constant even though the ambient temperature changes. While the specification will describe the invention in the environment of a magnetron, it will be obvious that the invention has application with klystrons and other oscillators and is not limited to magnetrons.

It is well known to those skilled in the art that magnetrons are subject to frequency variations due to changes in ambient temperature. In the past many techniques have been attempted to resolve the problem, but each of these techniques has major shortcomings. One technique employed is to limit the minimum temperature by providing electrical heaters and thermostats. This, however, results in large power consumption plus the fact that the heaters raise the ambient temperature of other surrounding components and the equipment as a whole. A second approach makes use of automatic-frequency-control circuits placed at the output of the magnetron. This approach involves space, power and weight considerations and while such considerations may, at times, be tolerated the most important consideration is the reliability of the components. A third technique is the use if a high Q cavity placed at the output of the magnetron. While this technique provides a truly constant frequency, the cavity must be loosely coupled and, therefore, is subject to high losses. Also, because the cavity has a high Q it has a narrow band width and therefore does not have application for narrow pulses.

It is an object of the present invention to provide a new and improved oscillator frequency compensator.

It is another object of the present invention to provide a new and improved oscillator frequency compensator which is not subject to the above-mentioned shortcomings.

In accordance with a particular form of the present invention an oscillator frequency compensator comprises an oscillator subject to frequency variations due to temperature changes, the oscillator having a load impedance, and detection means for detecting the temperature changes. The invention also includes means responsive to the detection means for controlling the frequency of the oscillator by changing the load impedance thereof.

For a better understanding of the present invention, together with other and further objects thereof, reference is had to the following description, taken in connection with the accompanying drawing, and its scope will be pointed out in the appended claims.

Referring to the drawing, there is shown a preferred embodiment of the present invention.

*Description and Operation*

The drawing shows an oscillator frequency compensator constructed in accordance with the present invention. An oscillator 10 such as a magnetron, subject to frequency variations due to ambient temperature changes, supplies a signal to a wave guide 11 which, in turn, supplies the signal to a load 12. The ambient temperature surrounding the magnetron is subject to changes, and such temperature changes are detected by detection means 13. The detection means 13 may be composed of a plurality of pairs of bimetallic discs 14, 15, 16, and 17. Each bimetallic disc is preformed to the shape of a spherical dish and is composed of two differential metals, each metal having a different coefficient of expansion. The side of the bimetallic disc having the larger coefficient of expansion is shown dotted in the drawing. As shown in the drawing, the bimetallic disc pairs 14 and 15 have the metal having the higher coefficient of expansion on the convex surface, while the bimetallic disc pairs 16 and 17 have the metal having the higher coefficient of expansion on the concave surface. If the ambient temperature surrounding the magnetron increases, then bimetallic disc pairs 14 and 15 expand, while bimetallic disc pairs 16 and 17 contract. Running through the center of the detection means 13 is means 18 responsive to the detection means for controlling the frequency of the magnetron. More particularly, this last-mentioned means may be a probe which moves in or out of the wave guide, as indicated by the arrow, in accordance with the movements of the bimetallic discs of the detection means 13. As the probe moves in or out of the wave guide, the load impedance of the magnetron changes. Such changes in the load impedance cause the frequency of the magnetron to change. Therefore, for a specific change in ambient temperature which ordinarily causes a specific change in magnetron frequency, the detection means cause the probe to move an amount sufficient to cause the load impedance to change just enough to compensate for the change in magnetron frequency, thereby causing the magnetron frequency to remain constant or nearly constant even though the ambient temperature has changed.

It is to be pointed out that the location of the detection means along the wave guide determines the direction in which the probe should move due to an increase or decrease in temperature. As shown in the drawing, for an increase in temperature the probe is pulled out of the wave guide and for a decrease in temperature the probe is pushed into the wave guide. At some other point, the conditions may be such that, to cause the proper changes in impedance, the probe should be pushed into the wave guide for increases in temperature and should be pulled out of the wave guide for decreases in temperature. While there is this facility of choosing in which direction the probe should be moved in accordance with temperature changes, the detection means must be located at any of certain specified positions so that the movement of the probe will cause large changes in frequency while maintaining the output power constant.

In the foregoing description, the following assumptions have been made: (1) the frequency of the magnetron varies linearly with changes in ambient temperature; (2) the impedance varies linearly with the distance that the probe moves into the wave guide; and (3) the movement of the probe varies linearly with changes in ambient temperature. While for practical situations such assumptions are not entirely correct, these assumptions are sufficient for purposes of this specification. The curves which describe the above-mentioned relations are either fairly linear or have linear portions. By simple design techniques the frequency of the magnetron may easily be made to vary an amount sufficient to offset the change in frequency due to ambient temperature changes.

While there has been described what is at present considered to be the preferred embodiment of this invention, it will be obvious to those skilled in the art that various changes and modifications may be made therein without departing from the invention and it is, therefore, aimed to cover all such changes and modifications as fall within the true spirit and scope of the invention.

What is claimed is:

1. An oscillator frequency compensator comprising: an oscillator subject to frequency variations due to temperature changes, said oscillator having a load impedance; a plurality of bimetallic discs which expand or contract in response to temperature changes; and means responsive to the expansion and contraction of said bimetallic discs for controlling the frequency of said oscillator by changing the load impedance thereof.

2. A magnetron frequency compensator comprising: a magnetron subject to frequency variations due to temperature changes, said magnetron having a load impedance; detection means for detecting said temperature changes; and means responsive to said detection means for controlling the frequency of said magnetron by changing the load impedance thereof.

3. A magnetron frequency compensator comprising: a magnetron subject to frequency variations due to temperature changes, said magnetron having a load impedance; a plurality of bimetallic discs which expand or contract in response to temperature changes; and means responsive to the expansion and contraction of said bimetallic discs for controlling the frequency of said magnetron by changing the load impedance thereof.

4. An oscillator frequency compensator comprising: an oscillator subject to frequency variations due to temperature changes, said oscillator having a load impedance; detection means for detecting said temperature changes; and means responsive to said detection means for controlling the frequency of said oscillator by changing the load impedance thereof.

References Cited in the file of this patent

UNITED STATES PATENTS

| 1,778,827 | Evans | Oct. 21, 1930 |
| 2,151,752 | Ellis | Mar. 28, 1939 |
| 2,158,844 | Andrews | May 16, 1939 |
| 2,439,809 | Hunter | Apr. 20, 1948 |
| 2,747,091 | Fraser | May 22, 1956 |
| 2,751,499 | Glass | June 16, 1956 |